United States Patent [19]

Tsunoda et al.

[11] 4,363,597
[45] Dec. 14, 1982

[54] METHOD FOR OPERATING PUMPS

[75] Inventors: Sachio Tsunoda; Katsunori Shirasu, both of Yokohama, Japan

[73] Assignee: Tokyo Shibaura Denki Kabushiki Kaisha, Kawasaki, Japan

[21] Appl. No.: 213,231

[22] Filed: Dec. 5, 1980

[30] Foreign Application Priority Data

Dec. 28, 1979 [JP] Japan .................................. 54-173292

[51] Int. Cl.³ ................................................ F03B 3/10
[52] U.S. Cl. .......................................... 415/1; 415/500
[58] Field of Search ...................... 415/1, 61, 66, 500; 417/53, 247

[56] References Cited

U.S. PATENT DOCUMENTS 4,318,004  3/1982  Tsunoda ............................. 415/500

FOREIGN PATENT DOCUMENTS 54-126843 10/1979 Japan ..................................... 415/1
688680 10/1979 U.S.S.R. ................................. 415/1

Primary Examiner—Louis J. Casaregola
Attorney, Agent, or Firm—Oblon, Fisher, Spivak, McClelland & Maier

[57] ABSTRACT

A method for operating pumps in a pumping-up power plant having a single speed reversible pump turbine and a booster pump, the booster pump being provided in a branch pipe which is provided in parallel with a portion of a draft tunnel between the pump turbine and a lower reservoir, is disclosed. The method for operating the pumps comprises the steps of, closing an inlet valve at the discharge side of the pump turbine, closing a portion of the draft tunnel which is in parallel with the branch pipe, opening the branch pipe, starting the pump turbine in air as a pump, starting exhaustion of the air remaining inside the pump turbine when the rotation speed thereof reaches a predetermined value, starting the booster pump after the exhaustion is started, and opening the inlet valve at the discharge side of the pump turbine after the rotation speed of the booster pump reaches a predetermined value.

4 Claims, 3 Drawing Figures

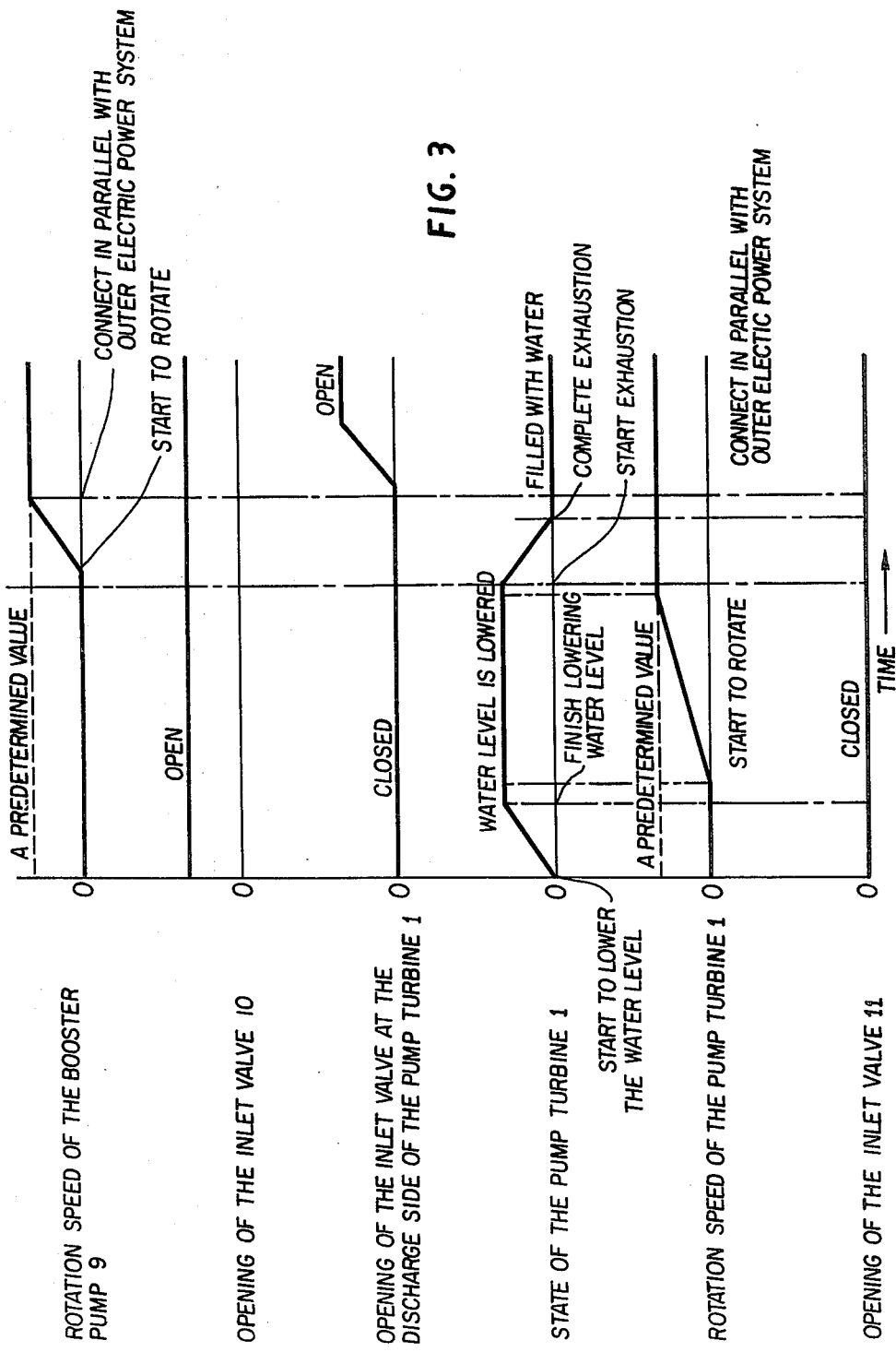

METHOD FOR OPERATING PUMPS

BACKGROUND OF THE INVENTION

1. Field of the Invention

This invention relates to a method for operating pumps, and more particularly to a method for starting pumps in a pumping-up power plant having a single speed reversible pump turbine and a booster pump.

2. Description of the Prior Art

Generally, a single speed reversible pump turbine has such characteristics that the maximum efficiency point in the turbine operation mode is different from that in pump operation mode.

Namely, the turbine net head where the efficiency in turbine operation is maximum is larger than the pump total head where the efficiency in pump operation is maximum. But in a practical pumping-up power plant, the turbine net head in turbine operation is smaller than the pump total head in pump operation by the head loss of the water way between an upper reservoir and a lower reservoir. Therefore, when a pump turbine is operated as a turbine at a high efficiency speed or point, where the efficiency in pump operation is low, then it must be operated as a pump at a low efficiency point. Recently a new pumping-up power plant has been proposed where there is provided a booster pump in series with a single speed reversible pump turbine in order to prevent low efficiency in pump operation of the pump turbine. Namely, the booster pump is operated to provide a certain part of the necessary head for a high efficiency operation in the pumping-up power station in addition to the head generated by the pump turbine. As pumping-up power plants are confronted by a keen demand for high efficiency operation of the pump turbine from an economical standpoint, the demand for a method of operating a single speed reversible pump turbine together with a booster pump is very promising. But many technical problems arise in the operation of a single speed reversible pump turbine together with a booster pump, and an accurate control technique is necessary, especially in pump operation, for control in pump operation is very complicated.

SUMMARY OF THE INVENTION

Accordingly, one object of this invention is to provide a novel method for operating pumps in a pumping-up power plant having a single speed reversible pump turbine and a booster pump, in which the pump turbine as a pump and the booster pump can be started in series with each other, simply and without a complicated starting technique.

Another object of this invention is to provide a method for operating pumps in a pumping-up power plant having a single speed reversible pump turbine and a booster pump in which the pump turbine as a pump and the booster pump can be started in series with each other smoothly and promptly, without a complicated starting technique.

These and other objects of this invention can be achieved by providing a method for operating pumps in a pumping-up power plant having a single speed reversible pump turbine and a booster pump, the booster pump being provided in a branch pipe which is provided in parallel with a portion of a draft tunnel between the pump turbine and a lower reservoir. The method includes the steps of closing an inlet valve at the discharge side of the pump turbine, closing the portion of the draft tunnel which runs in parallel with the branch pipe, opening the branch pipe, starting the pump turbine in air as a pump, starting exhaustion of the air remaining inside the pump turbine after the rotation speed thereof reaches a predetermined value, starting the booster pump after starting the exhaustion and opening the inlet valve at the discharge side of the pump turbine after the rotation speed of the booster pump reaches a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2 and 3 are diagrams illustrating the time sequence of preferred embodiments of this invention.

DESCRIPTION OF THE PREFERRED EMBODIMENTS

Figure 1:
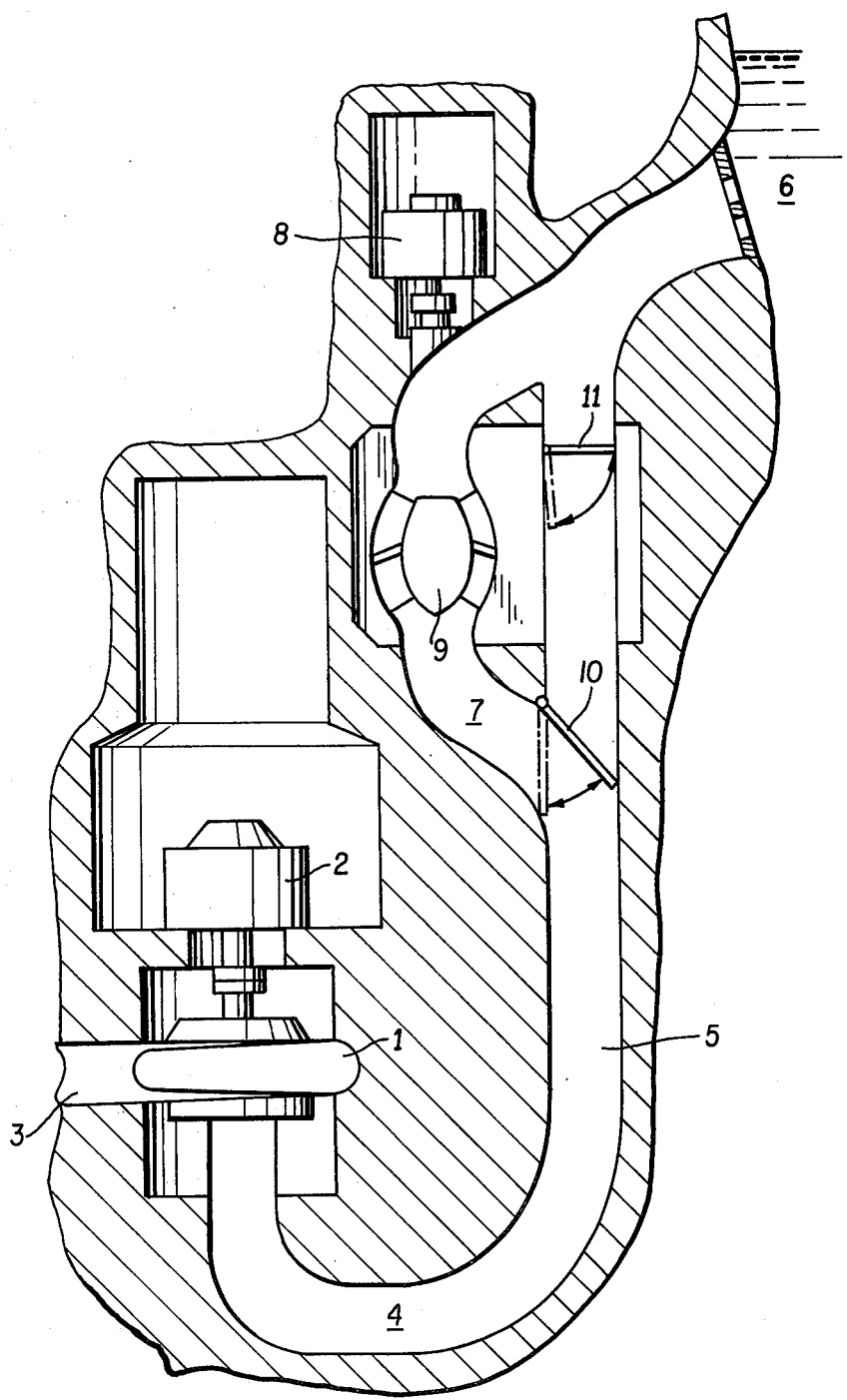
FIG. 1 is a schematic drawing of a pumping-up power plant which is used for applying this invention.

Referring now to the drawings, wherein like reference numerals designate identical or corresponding parts throughout the several views, and more particularly to FIG. 1 thereof, there are shown a single-speed reversible pump turbine 1 and a motor-generator 2 directly coupled to the pump turbine 1. Also, there are shown a pipe line 3 connecting the pump turbine 1 with an upper reservoir (not shown), a lower reservoir 6, a draft tunnel 5 connecting a draft tube 4 of the pump turbine 1 with the lower reservoir 6, a branch pipe 7 provided in parallel with a portion of the draft tunnel 5 to bypass the draft tunnel 5, and a booster pump 9 in the middle of the branch pipe 7. Numeral 10 designates an inlet valve disposed at the discharge side of the booster pump 9 in the branch pipe 7 and numeral 11 designates an inlet valve disposed in a portion of the draft tunnel 5 where the branch pipe 7 runs in parallel with the draft tunnel 5. Numeral 8 denotes a driving unit for driving the booster pump 9. To simplify the drawing, the connection between the booster pump 9 and the driving unit 8 is omitted, and the booster pump 9 is drawn only symbolically. There are also provided guide vanes (not shown) in the pump turbine 1 which act as an inlet valve at the discharge side thereof. Now there will be described the operation of the pumping-up power plant with the above mentioned construction. Hereinafter the states of the inlet valve 10 and the inlet valve 11 are defined as follows: the solid line position of the inlet valve 10 shows its open state and the broken line, its closed state; the solid line position of the inlet valve 11 shows its closed state and the broken line, its open state in FIG. 1. First, in turbine operation of the pump turbine 1, the inlet valve 10 is moved to its broken line position to close branch pipe 7 and inlet valve 11 is moved to its broken line position to open the draft tunnel 5, thereby directly connecting the draft tunnel 5 with the lower reservoir 6, and the pump turbine 1 is run as a water turbine. FIG. 1 shows this position in broken lines. In this case water current introduced from an upper reservoir (not shown) is supplied to drive the pump turbine 1 via the pump line 3, and then flows out into the draft tube 4. The pump turbine 1 performs a turbine operation, driving the motor-generator 2 to generate electric power. The current delivered to the draft tube 4 flows out into the lower reservoir 6 via the draft tunnel 5. At this time the booster pump 9 is not in operation.

In operating the pump turbine 1 as a pump, on the other hand, the inlet valve 10 is moved to its solid line position to open the branch pipe 7 and the inlet valve 11 is moved to its solid line position to close the portion of the draft tunnel 5 running in parallel with the branch pipe 7. Accordingly, the draft tube 4 is connected to the lower reservoir 6 via the branch pipe 7 opening in the middle of the draft tunnel 5 and a portion of the draft tunnel 5 on the lower reservoir 6 side. FIG. 1 shows this position in solid lines. In this case, the pump turbine 1 is driven by the motor generator 2, while the booster pump 9 is driven by the driving unit 8. Since the pump-turbine 1 and the booster pump 7 are hydraulically connected in series with each other, water sucked from the lower reservoir 6 into the lower reservoir side portion of the draft tunnel 5 by the booster pump 9 flows into the pump turbine 1 through the branch pipe 7, the portion of the draft tunnel 5 on the pumps turbine 1 side, and the draft tube 4, and is pressurized and forced up to the upper reservoir by means of the pipe line 3.

Hereinafter a method for starting the pump turbine 1 as a pump and booster pump 9 according to this invention will be described in detail.

Figure 2:
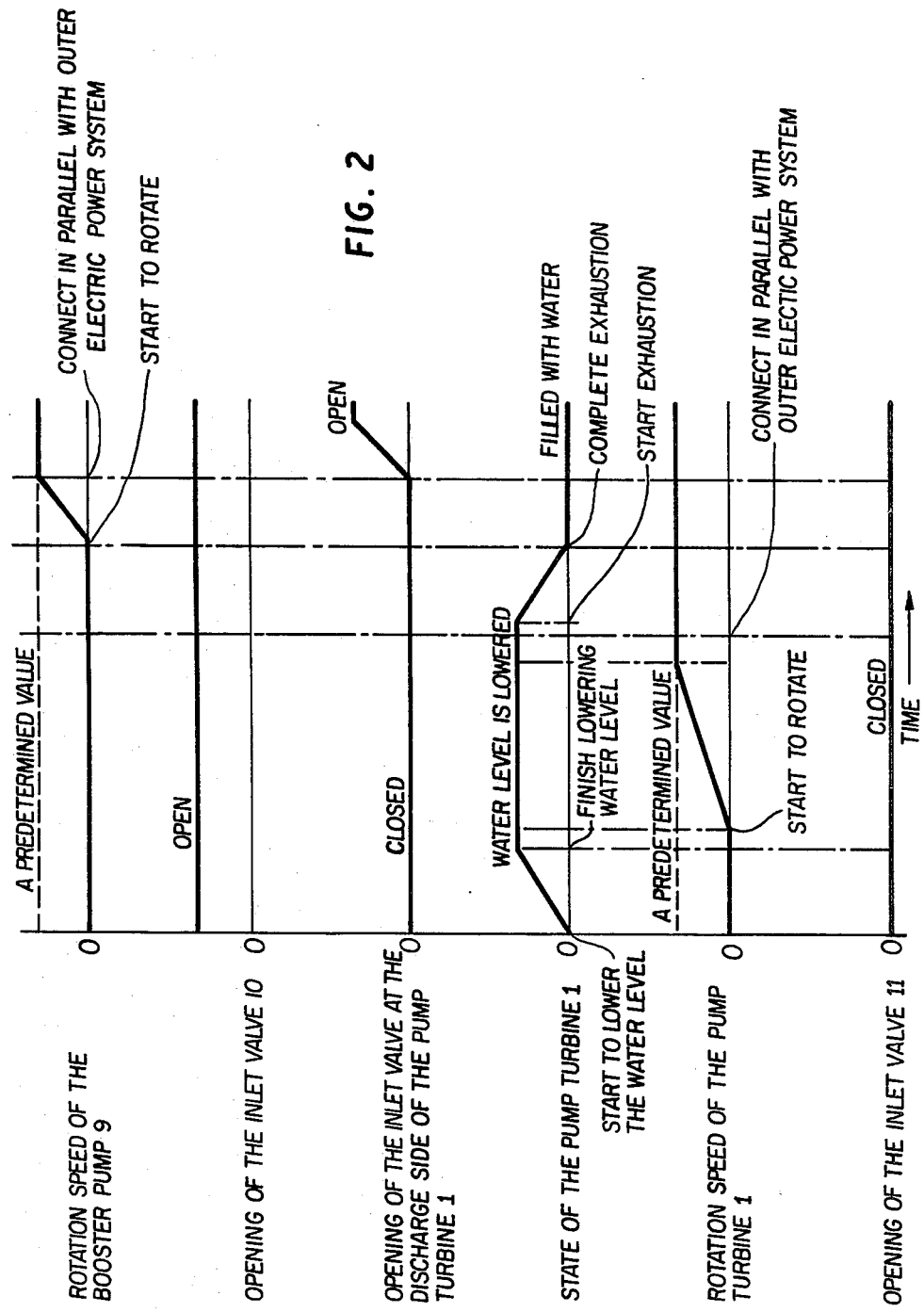

First the inlet valve (not shown) at the discharge side of the pump turbine 1 is closed, and the inlet valve 10 is moved to its solid line position and the inlet valve 11 is moved to its solid line position to open the branch pipe 7 and to close the portion of the draft tunnel 5 running in parallel with the branch pipe 7, respectively. Accordingly the inside of the pump turbine 1 is connected with the lower reservoir 6 via the branch pipe 7. Then air is fed into the inside of the pump turbine 1 by an air compressor (not shown) to lower the water level. When the water level reaches below the runner or runners (not shown) of the pump turbine 1 the pump turbine 1 is started in air as a pump by a small capacity internal starter motor. After the rotation speed of the pump turbine 1 reaches a predetermined value, the pump turbine 1 is connected in parallel with the outer electric power system. The exhaustion of the air remaining inside of the pump turbine 1 by a vacuum source (not shown) connected to the pump turbine 1 the pump turbine 1 is started. When the exhaustion is completed, the booster pump 9 is started in water by an internal power source in the driving unit 8. When the rotation speed of the booster pump 9 reaches a predetermined value, the booster pump 9 is also connected in parallel with the outer electric power system. Then the inlet valve of the discharge side of the pump turbine 1 is opened to operate the pump turbine 1 as a pump and the booster pump 9 in series with each other. FIG. 2 shows the time sequence of the operation described above.

According to this invention, both the inlet valve 10 and the inlet valve 11 are operated to be opened or closed at the condition where the inlet valve of the discharge side of the pump turbine 1 is closed and neither the pump turbine 1 nor the booster pump 9 is in operation; namely, there is no water flow in either the draft tunnel 5 or the branch pipe 7. Therefore both the inlet valve 10 and the inlet valve 11 can be operated to be opened or closed safely and rapidly and with low operating power.

Moreover, in the process of the starting operation of the pump turbine 1 as a pump in air, and connecting it in parallel with the outer electric power system, the booster pump 9 in the branch pipe 7 which is connected with the pump turbine 1 in the same waterway is not in operation. Therefore the pump turbine 1 can be started as a pump in air and connected in parallel with the outer electric power system smoothly and stably without giving agitation to the lowered water level.

Also, the booster pump 9 is connected in parallel with the outer electric power system in a condition where the inlet valve 10 is opened and the booster pump 9 is connected with the pump turbine 1 through the same waterway. So the pump turbine 1 and the booster pump 9 can subsequently be started as a pump in series with each other by opening the inlet valve of the discharge side of the pump turbine 1 immediately and simply without a complicated starting technique.

In the embodiment of this invention described above, the booster pump 9 is started in water just after the completion of the exhaustion of the air remaining inside the pump turbine 1. But this invention is not restricted to this embodiment. For example, the booster pump 9 can be started in water just after the exhaustion of the air is started or during the exhaustion process (FIG. 3). In this case, the water pressure generated by the rotation of the booster pump 9 is applied to the draft tube 4 of the pump turbine 1, so the exhaustion pressure in the pump turbine 1 is raised and the exhaustion is finished rapidly. In this embodiment the time from the beginning to the starting of pumping-up operation can be shorter than in the embodiment described above.

Moreover in the pumping-up power plant shown in FIG. 1, both terminals of the branch pipe 7 are connected to the draft tunnel 5. This invention can also be applied to a pumping-up power plant where one terminal of the branch pipe 7 is connected directly to the lower reservoir 6.

As described above, this invention can provide a method for operating pumps in a pumping-up power plant having a single speed reversible pump turbine and a booster pump in which the pump turbine as a pump and the booster pump can be started in series with each other, simply, smoothly and promptly without a complicated starting technique.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for operating pumps in a pumping-up power plant having a single speed reversible pump turbine and a booster pump, said booster pump being provided in a branch pipe which is in parallel with a portion of a draft tunnel between said pump turbine and a lower reservoir; comprising the steps of:
   closing an inlet valve at the discharge side of said pump turbine;
   closing said portion of said draft tunnel which runs parallel with said branch pipe;
   opening said branch pipe;
   starting said pump turbine in air as a pump;
   starting exhaustion of the air remaining inside said pump turbine after the rotation speed thereof reaches a predetermined value;

starting said booster pump after starting said exhaustion; and opening said inlet valve at the discharge side of said pump turbine after the rotation speed of said booster pump reaches a predetermined value.

2. A method for operating pumps according to claim 1 wherein:

the step of starting said booster pump is performed after completion of said exhaustion.

3. A method for operating pumps according to claim 1 or claim 2 wherein:

in the step of starting said booster pump, said booster pump is started in water.

4. A method for operating pumps according to claim 3 wherein:

the step of closing said portion of said draft tunnel and the step of opening said branch pipe are performed by opening an inlet valve disposed at the discharge side of said booster pump in said branch pipe and closing an inlet valve disposed in said portion of said draft tunnel where said branch pipe runs in parallel with said draft tunnel.

* * * * *